Sept. 16, 1930.  J. W. MILNOR ET AL  1,775,687
MEASURING THE EFFICIENCY OF TELEGRAPH TRANSMISSION
Filed May 31, 1929    3 Sheets-Sheet 1
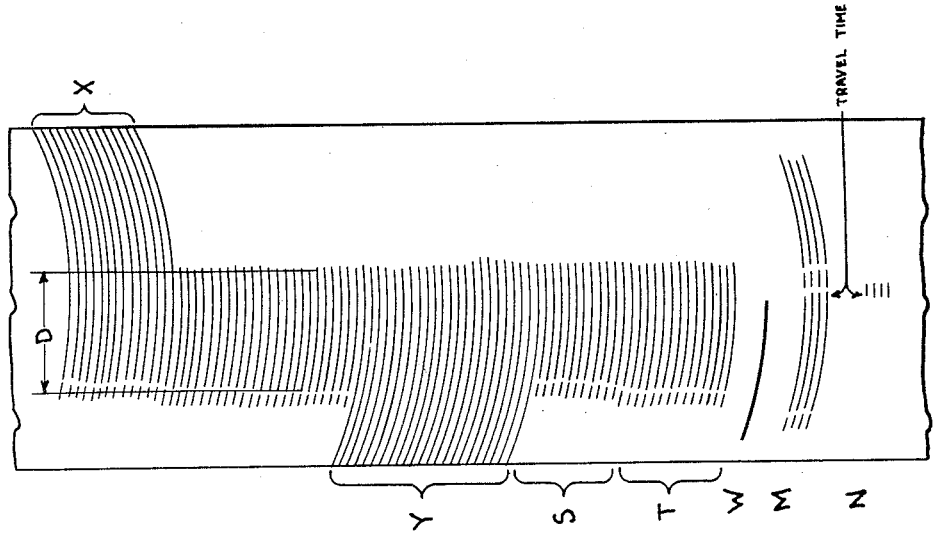
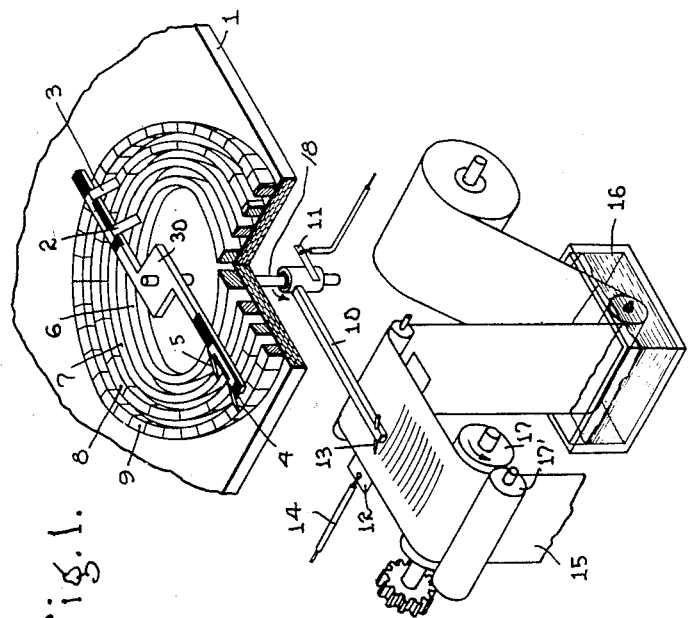
Inventor
J. W. MILNOR.
F. B. Bramhall.
By Eugene C. Brown
Attorney Sept. 16, 1930.   J. W. MILNOR ET AL   1,775,687
MEASURING THE EFFICIENCY OF TELEGRAPH TRANSMISSION
Filed May 31, 1929   3 Sheets-Sheet 2
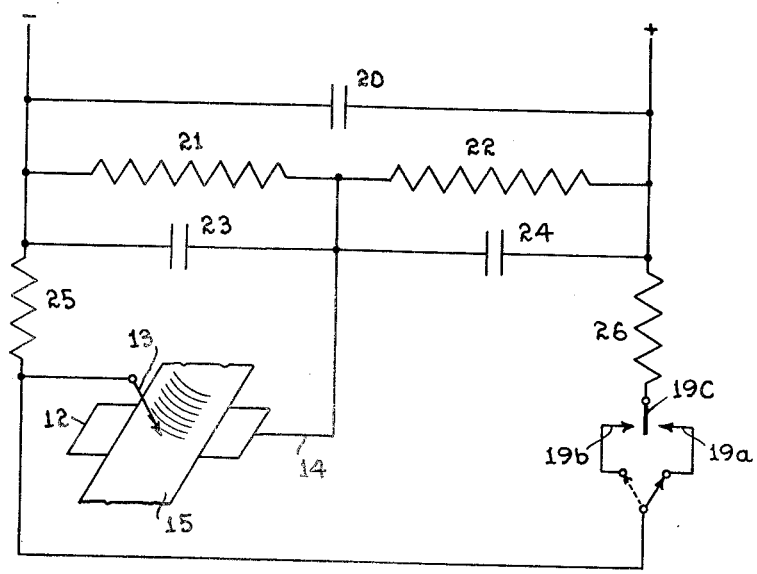
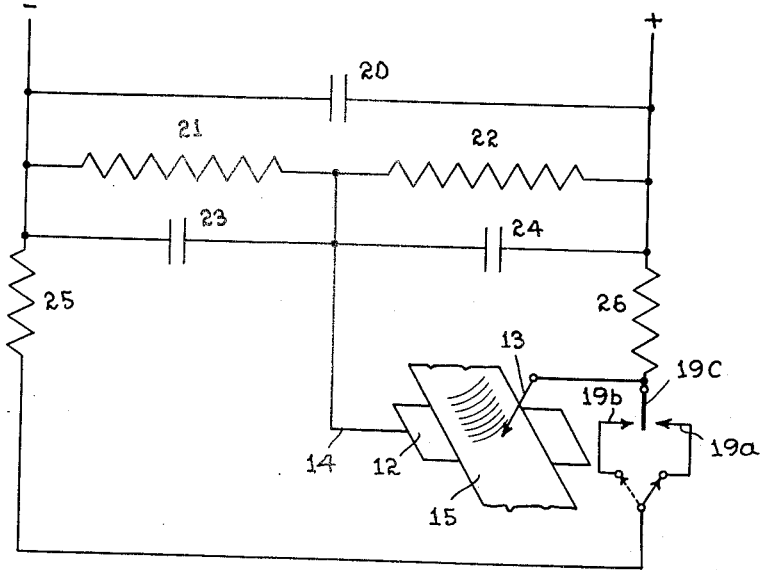
Inventor
J. W. MILNOR.
F. B. Bramhall
Eugene C. Brown
By
Attorney Patented Sept. 16, 1930

1,775,687

UNITED STATES PATENT OFFICE

JOSEPH W. MILNOR, OF MAPLEWOOD, AND FAY B. BRAMHALL, OF METUCHEN, NEW JERSEY, ASSIGNORS TO THE WESTERN UNION TELEGRAPH COMPANY, OF NEW YORK, N. Y., A CORPORATION OF NEW YORK

MEASURING THE EFFICIENCY OF TELEGRAPH TRANSMISSION

Application filed May 31, 1929. Serial No. 367,577.

Our invention relates to methods of and means for measuring the efficiency of telegraph transmission.

Telegraphic signals as reproduced by the receiving apparatus have been affected by various factors in transmission over the circuit. A signal may be shortened or lengthened due to the characteristics of the line and the terminal and repeater apparatus and the effect of previously transmitted signal combinations. Signals are also subjected to a time lag between transmission and reception caused by both the line and the associated apparatus. If the lag were constant, that is if all the signals on a given circuit were received with the same lag, this form of distortion would, in general, be unimportant. However the characteristics of the circuit are such that the lag is variable depending upon the particular combination of signals being transmitted. Variable lag, or signal shifting is of importance particularly in telegraph systems in which the transmitting and receiving apparatus are synchronized. Other factors of importance are the tendency of relay armatures to bounce or rebound when making contact, the "travel time" of the armature in passing from one contact to the other, and electrical and mechanical bias. Signal transmission is also affected by extraneous disturbances and duplex unbalance, resulting in shortened, lengthened or false received signals.

In the operation and the experimental study of a telegraph circuit, it is important to know not only the maximum signaling speed but as well to know quantitatively the limiting factors and their individual effects on that speed. The various means available heretofore for determining such data has been either inconvenient to use, inaccurate, non-quantitative as to results, suitable only for overall circuit measurements, or inapplicable for use in connection with high-speed automatic circuits.

An object of our invention is to devise a method and means for measuring the effect upon telegraph signals of various causes of distortion and other factors tending to impair the operation over a given line or with given telegraph apparatus.

Our invention is useful for the accurate measurement of relative and absolute time intervals in an electric circuit. It is also useful for the measurement of time lag of operation of telegraph instruments, such as relays and the like.

Another object is to provide convenient and highly accurate means for determining quantitatively the efficiency of complete telegraph circuits and their component parts.

A particular object is to provide a transmission testing system applicable to high-speed, automatic telegraph circuits.

A further object is to provide a device suitable for laboratory use in the improvement and development of telegraph terminal and repeater apparatus.

Another object is to provide an improved type of chemical tape recorder.

Our invention may be described briefly as follows. A commutator on which various suitable signal combinations may be set up is arranged to transmit signal impulses into the circuit or apparatus under test at any desired signaling speed. After passing through the circuit or apparatus, a certain signal impulse, hereinafter called the test signal, is recorded on a tape impregnated with suitable chemicals, by a needle carried on a revolving arm. The test is repeated using different signal combinations preceding the test signal. Means are also provided for recording the test signal as transmitted. The received test signals are then compared with the transmitted test signal and from this comparison the transmission efficiency and characteristics of the circuit or apparatus are determined.

Our invention is illustrated in the accompanying drawing in which:

Fig. 1 is a fragmentary diagram illustrating one embodiment of the transmitting commutator and tape recording mechanism which form an important part of our invention.

Fig. 2 is a circuit diagram showing one method of connecting the recording mechanism to the receiving apparatus.

Fig. 3 is a circuit diagram showing a second method of connecting the recording mechanism to the receiving apparatus.

Fig. 5 illustrates an example of a tape record obtained from the recording mechanism.

Figure 4:
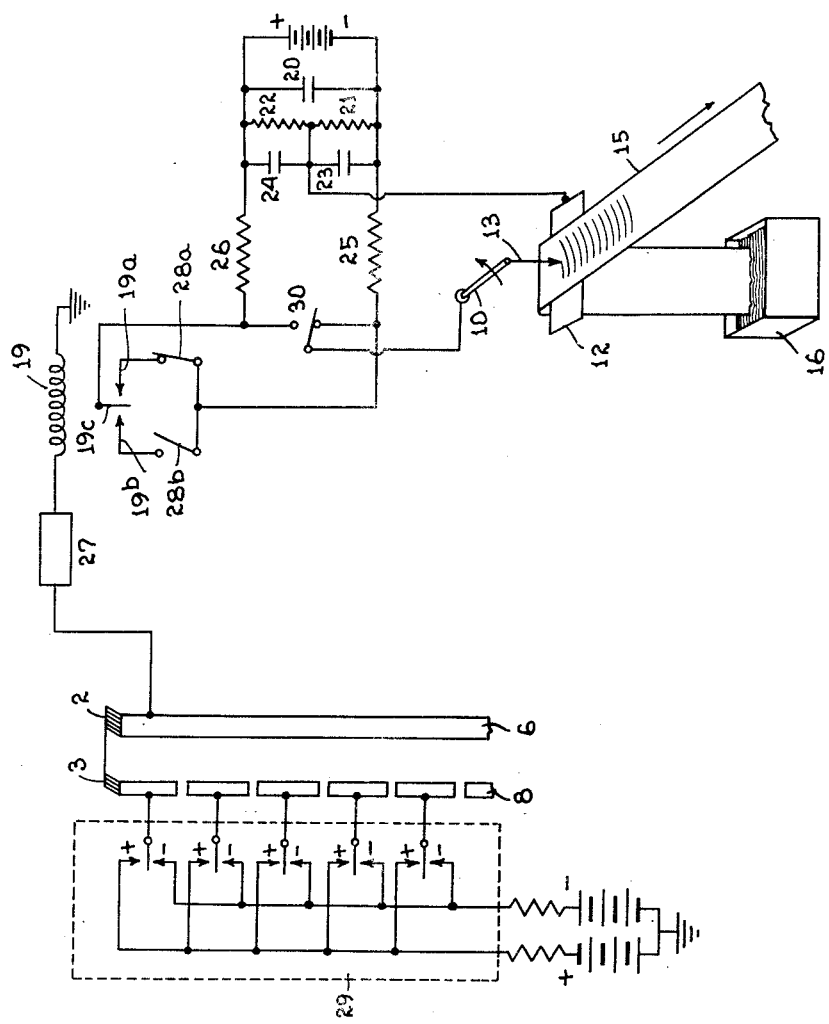
Fig. 4 is a circuit diagram showing the arrangement of the complete system.

Referring to Fig. 1 of the drawing, 1 is a commutator comprising brushes 2 and 3 which engage respectively with solid ring 6 and segmented ring 8, forming a signal transmitting arrangement; brushes 4 and 5 which engage respectively with solid ring 7 and segmented ring 9; and brush arm 30 driven by shaft 18. Shaft 18 is driven at constant speed by suitable means such as a fork-controlled motor. Ring 9 which is here shown as having double the number of segments of ring 8 may be used for a variety of purposes such as to obtain a higher signaling speed than is obtainable with ring 8, or in connection with means of maintaining shaft 18 in synchronism with apparatus at a distant point. Rings 7 and 9 are not an essential part of this invention. The tape recording mechanism comprises a suitable grade of paper tape 15 which is pulled over a conducting surface 12 such as a metal plate, after passing through a chemical bath 16. The tape is passed between rollers 17 and 17' the former being rotated uniformly by suitable means, thus pulling the tape. Arm 10, holding a marking needle 13 which makes contact with the tape, is driven by shaft 18. The chemical bath is a solution of potassium ferricyanide and ammonium chloride or other suitable chemicals. The needle is preferably of an iron or steel composition although certain other conducting materials may be used for this purpose. When an electric current is passed through the marking circuit in the direction from the needle to tape, a mark is recorded on the paper as the result of electro-chemical action. Thus, if while the rotating needle is passing over the tape, the circuit including the needle and the tape is energized with a current of the proper polarity, a line will be recorded on the tape.

The principle of the chemical tape recorder is well known. Telegraph systems involving the use of a chemical tape recorder for signal reception have been used to some extent in commercial telegraphy. So far as is known, it has not been used heretofore in telegraph transmission measuring apparatus for which it has been found to be particularly well adapted. In previous uses of the chemical tape recorder, the signals have been recorded lengthwise on the tape. The recorder described herein records the signals crosswise on the tape. This allows a large number of signals to be recorded on a short length of tape, and, as will be evident later, signals so recorded are in more convenient form for accurate comparison and measurement.

Chemical recording systems have a tendency to mark or record even when the circuit is not energized, which interferes with the proper recording of signals. This tendency may be overcome to a large extent by reversing the current through the recorder when no signal is being transmitted. Use was made of this fact in the commercial telegraph systems mentioned above. This was usually accomplished at the transmitting end of the circuit, the transmitter applying opposite polarity to the line during spaces between signals. In the present arrangement, this is accomplished locally by means which form a part of the recorder, as illustrated in Figures 2 and 3. $19^a$ and $19^b$ may be the contacts of the receiving relay of an extended telegraph circuit, or of a relay which is being tested alone. Figure 2 shows an arrangement in which the needle marks when the relay tongue makes contact with the energized contact or contacts. In Fig. 3, the needle marks when the tongue is not making contact or when it is making contact on an unenergized contact. Referring to Fig. 2, the resistances 21, 22, 25 and 26 are so proportioned that when the circuit through contacts 19 is open, current flows from + battery through resistance 22, then in part through the recorder and resistance 25 to − battery, the direction of current flow being from tape to needle, resulting in no mark on the tape. When the circuit is closed through either of the contacts, however, current flows through resistance 26 contacts 19, chemical recorder from needle to tape, and resistance 21 to − battery. This results in a mark on the paper tape, which if the needle is rotating is in the form of a slightly curved line. The condensers 20, 23 and 24 are for the purpose of accelerating the electrochemical reaction at the start of the mark on the tape and for decelerating the action at the end of a mark or beginning of a space. Thus when contacts 19 close, causing a marking current to flow through the recording circuit, the condensers are so arranged that a discharge current flows through the recording circuit in the same direction. This causes an increased current at the beginning of each mark with the result that the needle begins to mark instantaneously at full intensity. When the circuit through the relay contacts opens, causing a reversed current to flow in the recording circuit, the condenser arrangement also discharges in reverse direction through this circuit, the resulting increased current flow making the end of the mark (or beginning of the space) distinct and clearcut.

The arrangement of Figure 3 is such that a mark is recorded when the circuit through the relay contacts is open, no mark being made when the circuit is closed. The recording of spaces rather than signals, which is believed to be novel, is advantageous in certain instances mentioned later. As the operation of this circuit is similar to that of Fig. 2, no detailed description will be given.

Fig. 4 illustrates schematically the essential features of the invention and their application to telegraph transmission measurements. The commutator rings are here shown in development for convenience. Brushes 2, 3 and recording needle 13 are rotating at the same speed, being either driven from the same shaft as illustrated in Fig. 1 or driven separately and in synchronism. In certain cases they may be driven separately at substantially the same speed, but without automatic means for maintaining synchronism, as explained hereinafter.

29 is a manually operated switching arrangement by which any desired combination of positive and negative signaling pulses may be set up on the transmitting segments 8. These pulses are transmitted in turn via brushes 3, 2 and solid ring 6 and 27, to the circuit under test. Circuit 27 may be an extended telegraph circuit, with or without intermediate repeaters, terminating in a receiving relay 19, having contacts 19$^a$ and 19$^b$. Or relay 19 may be tested alone, i. e., with circuit 27 omitted. The latter case will be discussed first. The tongue 19$^c$ is operated in accordance with the signal pulses transmitted from segments 8, moving between contacts 19$^a$ and 19$^b$. With switch 28$^a$ closed, contact 19$^a$ is connected through the tape recorder circuit to tongue 19$^c$. The tape recorder circuit is of the form illustrated in Figs. 2 and 3, with switch 30 for changing from one arrangement to the other. With switch 30 thrown to its bottom position, as illustrated, the arrangement of Fig. 2 is obtained, the needle marking when the circuit is closed through the relay contacts. The arrangement is such that when a pulse transmitted from a certain segment operates the relay, the needle 13 is simultaneously moving across the impregnated tape 15, recording the test signal as repeated by the relay. The test signal is recorded once for each revolution of the commutator brushes. The test is repeated using various signal combinations preceding the test signal. When the test signal is immediately preceded or followed by a signal of the same polarity these signals will also be partially or completely recorded on the tape.

Fig. 5 shows a typical record of a polar relay, when tested in the manner just described. From the beginning of section X of the record to the end of section T a test signal is recorded for each revolution of the recorder. At section X the test signals are followed by a signal of the same polarity, and at section Y they have been preceded by a signal of the same polarity. The test signals are recorded approximately at the center portion of the tape, the approximate boundary of the test signal record being indicated by the two parallel lines D.

It will be assumed that the signals of Fig. 5 are unbiased. The record of the test signal as transmitted, hereinafter referred to as the transmitted test signal, shown at W, may be obtained by transmitting the test signal directly from the transmitting ring to the recorder or it may be obtained by rotating the transmitting brushes slowly enough so that the signal transmission through the relay under test is substantially perfect, and so that any time lag in the operation of the relay or any bouncing of the tongue on the contact is not perceptible on the record. Now, the efficiency of the relay may be obtained by comparing the received test signals with the transmitted test signal. The total lag of the relay is obtained by measuring the distance between the start of the transmitted test signal and the start of the received test signals. With the speed of signaling known the distance may be reduced to absolute time, or it may be expressed simply as a relative time such as percentage of the transmitted test signal. Variation of lag or signal shifting is determined by comparing the start of the various received test signals, for example sections S and T of the record. The variation of lag may be expressed in the same manner as for total lag. The bouncing or chattering of the relay contacts at the start of the signal is shown clearly on the record, the particular relay with which this record was taken having one short bounce at the beginning of each signal. The shortening of the signals in transmission through the relay is determined by comparing the effective length of the received test signals with the length of the transmitted test signal. The effective length of the received signals is the distance D between two parallel lines drawn respectively through the beginning of the received signal having the latest start and the end of the signal having the earliest termination. The effective received signal may then be expressed as a percentage of the transmitted signal, or in other convenient units.

The operation of the tongue to the other contact, 19$^b$, may be recorded in a similar manner by opening switch 28$^a$ and closing switch 28$^b$, and a comparison of the two records will indicate whether there is any electrical or mechanical bias in the circuit, such as unequal transmitting voltages, extraneous currents due to earth potentials or biased relays. Bias is indicated when the signals repeated by the two contacts are of unequal length.

To measure the travel time of the tongue 19$^c$ between contacts 19$^a$ and 19$^b$, if switches 28$^a$ and 28$^b$ are both closed, signals from both contacts will be recorded, and the travel time can be determined from the space between the recorded signals, the record being of the form shown at M in Fig. 5. The travel time may also be recorded as a mark by closing switch 30 on its upper contact, thus changing the tape recorder circuit to the arrangement of Fig. 3, the record being of the form shown at N in Fig. 5. The travel time may then be computed in percentage of transmitted signal and from the signaling speed in cycles per second the absolute time may be computed.

While the above tests have been described in connection with a relay only, the same method is followed in testing complete telegraph circuits, in which the communication line may be either real or artificial. Records of transmission over complete circuits will provide a measure of the overall efficiency of transmission. The distortion encountered will include, in addition to that caused by the receiving relay, the effect of the line, repeaters, duplex unbalance, etc. In the case of an actual line the test record will also show the effect of any induction or earth potentials that may be present. The record obtained under such conditions would be similar to Fig. 5, except that induction and duplex unbalance would be indicated by a greater irregularity of the recorded signals.

Although a telegraph relay has been shown as a convenient device for receiving the electrical impulses, and for operating the recorder in accordance with these impulses or currents, it should be understood that other types of receiving devices which can be arranged to control a local circuit can be used as well. Further, in some cases, a local receiving device may not be necessary at all, the test transmitter or modulator and the circuit or device under test both, being included in the circuit herein shown as a local recording circuit.

The preceding description applies to the case where both terminals of the circuit under test are at the same point. The method and apparatus may also be applied to the testing of extended telegraph circuits in which the terminals are located at different points. Referring to Fig. 4, it is obvious that the transmitting rings 6, 8 and the signal setting switches 29 may be located at one terminal of the circuit with the remainder of the testing apparatus which constitutes the receiving apparatus located at the other terminal of the circuit. Brushes 2, 3 may be driven in synchronism with marking needle 13. Methods of maintaining synchronism are well known and a description of such means is unnecessary. In some cases it is satisfactory and indeed preferable to dispense with the automatic means of maintaining synchronism, since the synchronizing means tends to introduce a slight irregularity in the recorded signals. If brushes 2, 3 are driven at constant speed and needle 13 is driven at substantially the same speed, any slight difference in speed does not prevent operation of the system, but is evident only as a gradual lateral displacement of the recorded test signals on the tape 15. This may be corrected by manually adjusting the speed of needle 13 from time to time. The transmission measurements with this arrangement of apparatus are made in the same manner as described above for the testing of a circuit with terminals at the same point. Instead of the special transmitting rings and signal setting switches at the transmitting end of the circuit, the transmitting side of a standard multiplex telegraph terminal set may be used. Thus for example one channel may be arranged to transmit continuously a certain letter with the other channels transmitting marking current, the whole forming a suitable combination of test signals. The chemical tape recording apparatus may be operated as described above, and by changing the character of letter being transmitted, the effect of various signal combinations is obtained. Still another method is to transmit one character, such as the letter Y, continuously and to drive the recording needle at constant speed but slightly slower or faster than the multiplex transmitter. The various elements of the letter Y are thus recorded in turn and without any adjustments or changes in the testing apparatus. Two such records may be taken, one with simplex and one with duplex operation of the circuit under test. From these records complete data is obtained regarding signal shifting, extraneous disturbances, relay contact bounce and armature travel time, and duplex unbalance. Data regarding signal bias is more conveniently obtained from a third record with the distant station transmitting reversals over the circuit under test.

From the foregoing description it will be seen that the time cycle of operation of the test signal is defined or set up at the receiving station by operating the recording stylus or needle in synchronism with the transmitter, and each received signal is recorded in proper position in its cycle of operation. Due to the fact that the recorder is of the cyclic type and records the test signals as adjacent parallel lines, it becomes an easy matter to measure the various time characteristics involved in the transmission by simply comparing the relative lengths and displacements of the records of the test signals, using the record of the slowly transmitted signal as a standard.

The apparatus and methods illustrated and described may, of course, be modified in a number of ways, to fit particular conditions. The flexibility of the arrangement is such that it is of very wide utility.

We claim:—

1. In a telegraph testing and measuring circuit, the combination of a recording instrument, a source of direct current for operating said instrument, a Wheatstone bridge comprising four resistance arms connected across said source, said recording instrument being connected between diagonal junctions of the bridge, the resistance being adjusted so that normally current tends to flow through the recording instrument in one direction but in the reverse direction when one arm of the bridge is opened, and means for opening and closing said arm in accordance with received signals.

2. In a telegraph testing and measuring circuit, the combination of a recording instrument, a source of direct current for operating said instrument, a Wheatstone bridge comprising four resistance arms connected across said source, said recording instrument being connected between diagonal junctions of the bridge the resistance arms being adjusted so that normally current tends to flow through the recording instrument in one direction but in the reverse direction when one arm of the bridge is opened, means for opening and closing said arm in accordance with received signals, and means for accelerating the reversal of current in said instrument comprising condensers connected in shunt to two of the arms of said bridge.

3. In a telegraph recording circuit, the combination of an electro-chemical recorder responsive only to current of a given polarity, means for normally supplying current of opposite polarity to the recorder, a receiving relay, and means controlled by said relay for supplying current of proper polarity to the recorder for operating the same in response to received signals.

4. In a telegraph recording circuit, the combination of an electro-chemical recorder responsive only to current of a given polarity, means for normally supplying current of opposite polarity to the recorder, a receiving relay, means controlled by the relay for supplying current of proper polarity to the recorder, and means comprising a condenser connected in a path in shunt to said recorder for accelerating the reversal of current through the recorder.

5. In a telegraph recording and testing system, the combination of a receiving relay, a recorder responsive to current of one polarity only, a source of current for energizing said recorder, circuits for normally supplying current of one polarity to said recorder, circuits controlled by said receiving relay for reversing the polarity of the current supplied to the recorder, and a switch for reversing the polarity of the normal current supplied to the recorder.

6. In a telegraph recording and testing system, the combination of a polarized receiving relay having spacing and marking contacts, a recorder responsive to current of one polarity only, a source of current for energizing said recorder, circuits for normally supplying current of proper polarity to said recorder, and circuits controlled by both said spacing and marking contacts for reversing the polarity of the current supplied to said recorder, whereby the recorder records only the time of travel of the receiving relay from one contact to the other.

7. In a circuit for recording electrical impulses, an electro-chemical recorder responsive only to current of a given polarity, means for normally supplying current of opposite polarity to the recorder, a receiving device, and means controlled by said device for supplying current of the proper polarity to the recorder for operating the same in response to received current impulses.

8. In a telegraph recording and testing system, the combination of a receiving relay having operating contacts, at least one being active, a recorder responsive to current of one polarity only, a source of current for energizing said recorder, circuits for normally supplying current of proper polarity to said recorder, and circuits controlled by said active contact for reversing the polarity of the current supplied to said recorder, thereby causing the recorder to record the time intervals between successive engagements of the tongue of the recording relay with said active contact.

Signed at New York in the county of New York and State of New York this 27th day of May, 1929 A. D.

JOSEPH W. MILNOR.
FAY B. BRAMHALL.